Nov. 23, 1954     M. R. JEPPSON     2,695,374
SUSTAINED HIGH VOLTAGE POWER SOURCE
Filed July 3, 1953     2 Sheets-Sheet 1
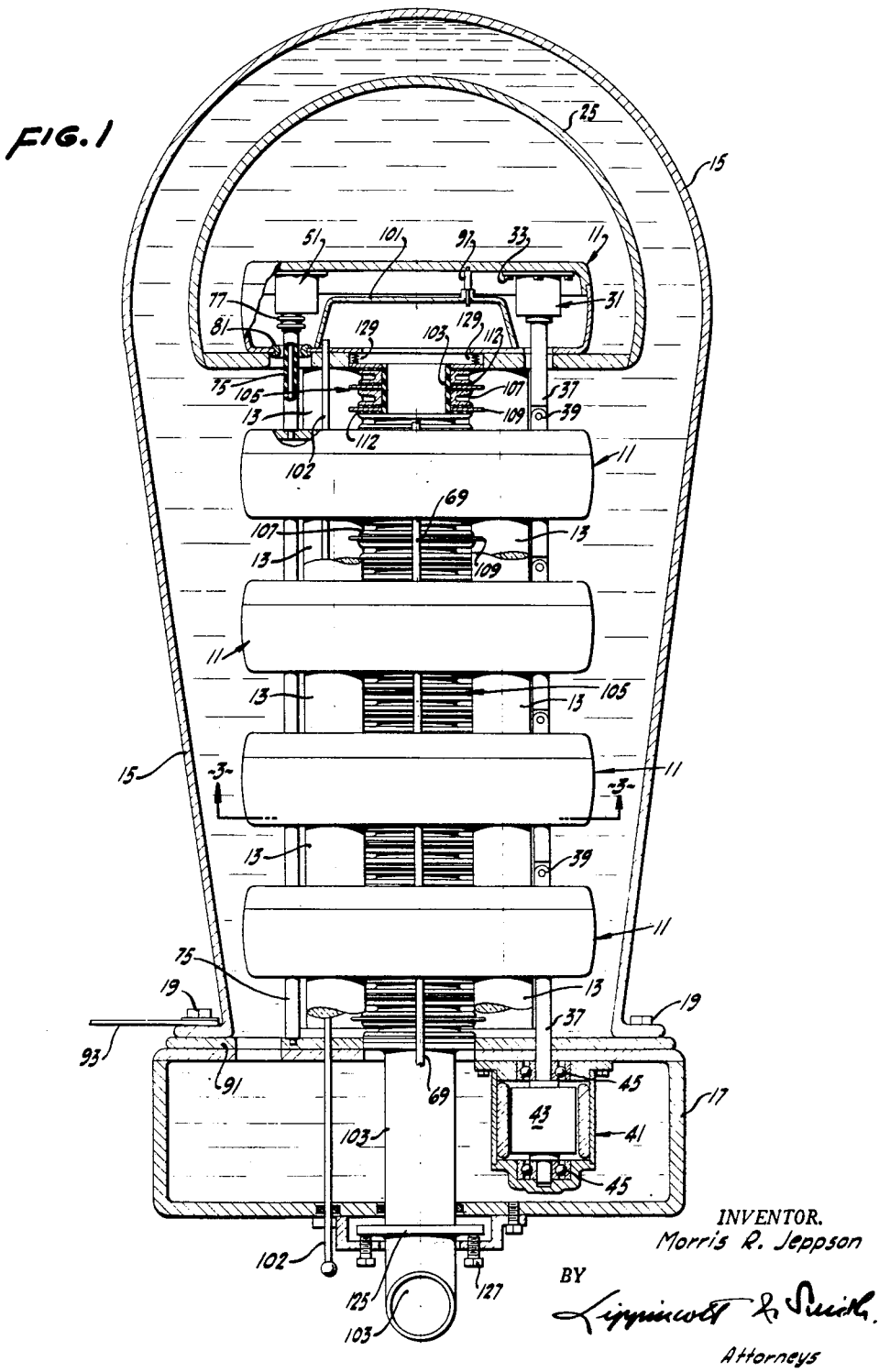
INVENTOR.
Morris R. Jeppson

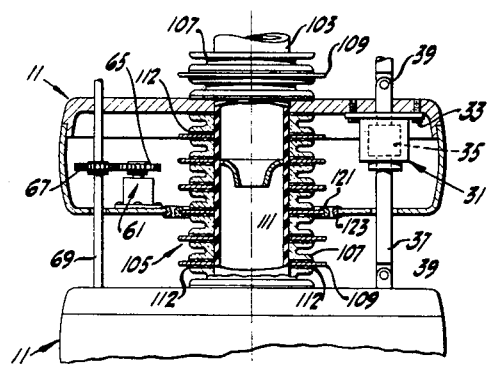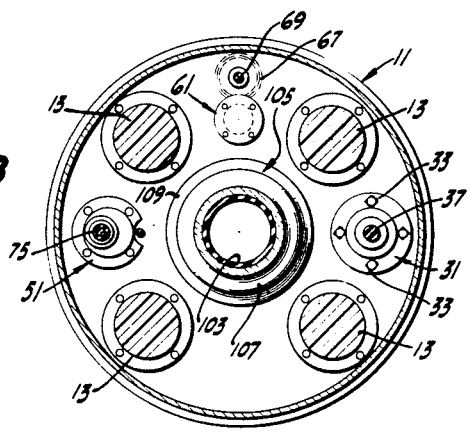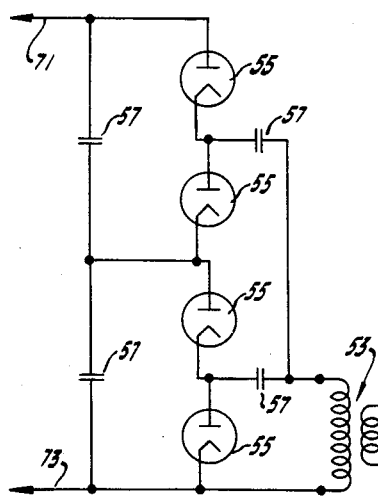

United States Patent Office 2,695,374
Patented Nov. 23, 1954

2,695,374

SUSTAINED HIGH VOLTAGE POWER SOURCE

Morris R. Jeppson, Orinda, Calif., assignor of forty per cent to David W. Garbellano, Berkeley, Calif.

Application July 3, 1953, Serial No. 365,808

12 Claims. (Cl. 315—15)

The present invention relates to a power source capable of developing current measurable in the range of one tenth of an ampere sustained by voltages of the order of megavolts. Power sources of this type are particularly desirable for use as direct current linear accelerators although, of course, having value as power sources of general application.

Currently existing power sources capable of supplying voltages of the order mentioned are limited in power producing ability because of low available current, i. e. of the order of a few microamperes or at most a fraction of one milliampere. Recently developed power sources for use in the megavolt range employ charge transfer and accumulation to build up the desired voltages. However, there is a definite limitation on the amount of current obtainable from such sources due to the effects of inherent capacity and rigid insulation requirements.

The present invention operates upon mechanically supplied power in contrast with charge build up. The invention cascades conventional power supplies within a fluid impermeable housing provided with individual Faraday spaces in the form of conductive shells mutually arranged to yield optimum insulation while employing to advantage a built-in capacity voltage distributing arrangement. Conventional power supplies within the contemplation of the instant invention are marketed by, for example, Westinghouse Electric Corporation and General Electric Company for use with medical X-ray apparatus. These commercially available supplies are capable of providing 25 milliamperes of filtered current up to 220 kv. The power supplies may include an input voltage step-up transformer adapted to feed diode rectifiers conventionally arranged with storage condensers to form a voltage multiplier rectifier unit.

The conductive shells contain and support respectively the voltage multiplier rectifier units. The shells are spaced apart along insulator supports located within the housing adapted to contain insulating fluid. An A. C. generator preferably of the type employing a permanent magnet rotor is supported within each shell and an insulating drive shaft penetrates each of the shells to serve as the rotor driving means. A suitable motor, for example, of the synchronous type is supported within the housing and coupled to the insulator drive shaft to rotate the generator rotors simultaneously. The stators of the generators respectively supply the step-up transformers of the voltage multiplier rectifier units through autotransformers provided for voltage level control. An insulating control rod also penetrates the shells and extends externally of the housing to permit adjustment of the variable taps on the auto-transformers through suitable gears or pulleys and belts.

The conductive shells respectively serve as one output terminal for each of the rectifier units. With the exception of one of the units the other output terminals thereof connect to adjacent shells such that the individual units are in electrical series relation. The output terminal of the excepted unit serves as one of the terminals of the high voltage power source, the other terminal thereof being connected to the shell electrically remote from that containing the excepted unit. It may thus be appreciated that the voltage developed by each unit is generally distributed between adjacent spaced apart shells located in the insulating medium.

The invention although of general application will be further described in connection with its use as a linear D. C. accelerator. A particle source such as any of the commercially available ion sources is located within the fluid impermeable housing in electrical isolation from the remaining structure therein. One terminal of the high voltage power source is connected to the particle source in conventional manner. This terminal may, of course, be either the negative or positive power source terminal depending upon the charge of the particle to be accelerated. The particle source is evacuated through a vacuum ductor tube extended externally of the housing to a vacuum pump. The vacuum duct may also comprise the path along which the particles travel during acceleration.

A column alternately comprised of annular insulators and conductive rings forms the vacuum duct within the fluid impermeable housing. This column also penetrates the conductive shells. Preferably faces of the shells respectively form spaced apart conductive rings in the column. Since the respective faces of the shells forming conductors in the column are at potentials differing by the output of the individual rectifier units, it may be appreciated that the column comprises a plurality of condensers in electrical series relation. By properly shaping the conductive rings of the column they form electron lenses operative on the particles being accelerated through the vacuum duct.

The direct accelerating voltage developed by the power source of the present invention may be substantially ripple-free. This is conveniently accomplished by staggering the phasing of the generator rotors from shell to shell causing the individual outputs of the rectifier units to be added out of phase and thereby reduce the overall effective ripple. Also, when desired, control may be exercised over the output voltage of the diode rectifiers through control of the filament current thereto. An insulator rod penetrating the shells and extending externally of the housing may also be provided to adjust the individual filament supply voltages. Likewise, the ion source variables may be regulated by a similar insulator rod.

With the foregoing in mind, among the objects of the present invention are the following: the provision of a high direct voltage-high power source; the provision of a direct current linear accelerator capable of high currents; the provision of such a high power source capable of developing substantially ripple-free output voltage; and, the provision of a compact high voltage source admitting of oil immersion.

Other and further objects of the present invention will become apparent to those skilled in the art from a reading of the following detailed description thereof when viewed in the light of the accompanying drawings wherein:

Fig. 1 is a view partly in section and partly in elevation of a power source in accordance with the present invention;

Fig. 2 is a view in section of one of the conductive shells of Fig. 1 and components included therein;

Fig. 3 is a bottom view of one of the shells of Fig. 1, the view being taken along the plane 3—3 with the lowermost portion of the shell removed; and Fig. 4 is a typical circuit diagram for the components contained in each shell.

Referring now to the drawings and particularly to Fig. 1, there are shown five metallic shells 11 spaced apart along the insulating supports 13 within a fluid impermeable tank or housing 15. The tank or housing 15 is attached to a motor housing 17 through, for example, the bolts 19; the housings 15 and 17 being in fluid communication with preferably insulating oil comprising the fluid although, of course, insulating gas under pressure may be employed if desired.

If, as is desirable particularly from the safety viewpoint, the housings 15 and 17 represent the zero reference or ground potential side of the high voltage source, then the upper or high potential end of the structure disposed within the housing 15 may terminate in a semispherical ball 25 having rounded edges to eliminate flux concentrations.

A typical conductive shell 11 is shown in section in Fig. 2 to reveal the components adapted to be supported therein. Each shell includes a generator 31 supported therefrom by the bolts 33. A permanent magnet rotor 35 is fixed on an insulator drive shaft 37 which penetrates the shells. When necessary, universal couplings 39 may be employed along the length of the insulator drive shaft 37 to compensate possible misalinement thereof. The shaft 37 may be of solid material or a tube of resin impregnated fiberglass or other mechanically strong insulator may be used to provide a shaft of minimum weight and maximum torsional stiffness. The shaft connects to a driving motor 41 (Fig. 1) either directly, or through suitable gearing. The rotor 43 of the drive motor is shown fixed to the insulator drive shaft 37 which is journaled in suitable bearings 45. However, it will be appreciated that driving speeds of 3,000 to 6,000 R. P. M. and higher may be desirable for the generator rotors 35 and accordingly the motor need merely be provided with a large diameter gear to mesh with a smaller diameter gear on the insulator drive shaft. In the alternative, the insulator drive shaft 37 could be provided with a series of large diameter gears to drive respectively smaller diameter gears on the individual generator shafts all of which is well known and forms no particular part of the present invention.

Within each shell, there is supported a voltage multiplier rectifier unit 51 of the previously mentioned commercially available type. A typical circuit for such a unit is shown in Fig. 4 wherein an input step-up transformer 53 supplies A. C. voltage to four diodes 55 connected with storage condensers 57 in conventional quadrupler fashion. Voltage doublers or multiplier circuits in general may replace the quadrupler circuit shown. The generators 31 contained within the individual shells 11 are represented by the A. C. supply source 31' which extends through a voltage level control unit, shown as the auto-transformer 61, to the step-up transformer 53. In Fig. 2 the adjustable tap 63 of the auto-transformer 61 may be connected to a gear 65 which meshes with a gear 67 carried by an insulating rod 69 extending externally of the fluid containing housings to permit adjustment of the voltage input to the rectifier multiplier units. The output of these units appears across terminals 71 nd 73, one of which connected to the individual shell containing the rectifier unit and the other of which passes through an insulated high voltage line 75 (Fig. 1) to the next lower or adjacent shell. A suitable ceramic insulator 77 is shown containing one of the output terminals 71 and 73 of Fig. 4. Since the potential established between the insulated high voltage line 75 and the conductive shell 11 (Fig. 1) is that developed by the rectifier multiplier unit 51 contained within the shell, suitable doughnut shaped conductors 81 are disposed respectively about the openings in the shells for the insulated high voltage line 75, thereby eliminating sharp edges or points and hence flux concentrations. This spacing between the doughnut shaped conductor 81 and the high voltage line 75 is such as to permit the conductive shells to contain insulating fluid.

As has been mentioned, one terminal of the high voltage power source of the present invention may comprise the housing 15 or 17 since the high voltage lead 75 is in electrical connection therewith through the horizontal support member 91. Accordingly, a lug 93 secured to the housing 15 by the bolt 19 may serve as this terminal. The high voltage lead 75 extends from the horizontal member 91 to the rectifier unit contained in lowermost conductive shell 11 and thence from the shell to rectifier unit to the uppermost shell contained within the semi-spherical terminating structure 25, this terminal being represented by the lead 97 in electrical connection with the upper shell 11. If the device of the present invention is to be used as a high power source supplying external equipment, the terminal 97 may be extended externally of the housings 15 and 17.

Each of the generators 31 may supply approximately 55 kv. to the step-up transformers 53. The A. C. voltage is rectified and quadrupled so that approximately 220 kv. is available across terminals 71 and 73 of each of the rectifier units. Since five such units are shown, the device, as illustrated, is capable of supplying 25 milliamperes of current at 1,100 kv. Of course, it will be apparent that the number of individual units employed is by no means limited to the five rectifier units shown. While the commercial X-ray power supplies are generally designed to supply 25 milliamperes of filtered current, there is no reason why the circuit of Fig. 4 could not employ higher rated tubes and components to increase the available current. Also, the invention contemplates the parallel connection of a plurality of stacked units, as shown in Fig. 5, preferably within a single housing to increase the current capacity. Accordingly, the power source as described is capable of developing as high as five million volts while supplying current approaching the ampere range.

A feature of the present invention permits its use as a D. C. linear accelerator. As is shown in Fig. 1, the upper shell 11 is adapted to contain a particle source, shown as the ion source 101, sealed off from the shell 11 through suitable cementary deposits around its edges. Particle sources are now commercially available and any type, filament, rod and the like may be employed for the purposes herein. Control of the source is permitted by the shaft 102 extended externally of the housings 15 and 17. A vacuum duct 103 in communication with the ion source 101 is provided to evacuate this source. The vacuum duct is contained within a voltage divider shown in the form of the vertical column 105 in Fig. 1. The column is comprised of alternate insulators 107 and conductor rings 109. The insulators 107 may comprise annular glazed porcelain segments externally grooved to improve their insulating characteristics. The conductive rings 109 may conveniently comprise annular copper plates fitted on either side with rubber gaskets 112.

As is best shown in Fig. 2, the upper surfaces of the shells 11, with the exception of the uppermost shell, replace the copper discs 109 where the column 105 penetrates the shells, thereby establishing a difference in potential across the segments of the columns between adjacent shells equal to the voltage output of the individual rectifier units. Thus, the column 105 may be regarded as a series of capacitors arranged in voltage dividing fashion. The difference in potential across adjacent conductive rings 109 enables the rings to function effectively as electron lenses, the path of the particles or ions being axially of the column 105 within the vacuum duct 103. As desired, additional converging lenses comprising the funnel-shaped annuli 111 (Fig. 2) may be carried by the spaced conductive rings 109. The conductive rings 109 disposed within the opening for the column 105 in the lower face of the shells 11 preferably have a doughnut shaped or toroidal guard ring 121 secured thereabout opposite to the conductive ring 123 carried by the shells 11 for the purpose mentioned in connection with the conductive ring 81 surrounding the high voltage lead 75.

The vacuum duct 103 extends externally of the housing 17 for connection to a vacuum pump (not shown). An annulus 125 secured to the duct 103 is seated within jack screws 127, provided to compress the vacuum tube 103 when necessary. Likewise, springs 129 (Fig. 1) disposed between the uppermost shell 11 and the uppermost conductive ring 109 cooperate with the jack screws to maintain the pressure on the seals and hold them vacuumtight when the jack screws are not in operation.

The circuit depicted in Fig. 4 is merely representative of known types of rectifier-multiplier circuits. Obviously, other circuits capable of the specified functions of voltage rectification and multiplication will serve equally as well in the power source of the instant invention. However, it may be noted that in this type of circuit, certain of the filter condensers usually included in power supplies of this type are eliminated; if the phasing of the generator rotors 35 is suitably staggered, thereby enabling substantially ripple-free output voltage, the ripple content decreasing with added stages. Also, the A. C. generators 31, while illustrated as a magneto-type, may be replaced by other forms of A. C. generators so long as suitable means is provided for coupling the generators to the drive shaft 37. It might be noted that generators employing only two poles and driven at 3600 R. P. M. develop 60 cycle outputs whereas generators with four poles driven at 6,000 R. P. M. produce 200 cycle outputs. The higher frequency outputs enable the rectifier multiplier units 51 to employ generally smaller components, such as the storage condensers 57, thereby lowering the cost of the device while also conveniently further decreasing the ripple content by introducing a greater number of rectified peaks or humps per time interval in the output wave.

What is claimed is:

1. A high voltage power source comprising, in combination, a plurality of individually shielded voltage multiplier rectifier units, means for supporting the rectifier units in spaced apart relation, a plurality of A. C. generators having rotors and stators, an insulated drive shaft adapted to drive the rotors, input connections respectively between the stators and the rectifier units, output connections between the rectifier units to connect the respective rectifier units in electrical series relation, a fluid impermeable housing enclosing the rectifier units, generators, and connections therefor in an insulating medium, and terminal connections in parallel with the series connected rectifier unit whereat D. C. power is available.

2. A sustained high voltage power supply comprising, in combination, a fluid impermeable housing adapted to contain insulating fluid, insulating supports secured within the housing, a plurality of conductive shells carried by the insulating supports and spaced apart therealong, an insulator drive shaft penetrating each of the shells, a plurality of A. C. generators respectively secured in the shells to be driven by the drive shaft, a plurality of voltage multiplier rectifier circuits respectively supported within the shells and each having a pair of output connections, A. C. input connections respectively between the generators and rectifier circuits, one output connection of each of the rectifier circuits connecting to the supporting shell therefor, a terminal connection to one of the shells and a further terminal connection to one of the rectifier circuits, and interconnections between the other rectifier circuits and adjacent shells to connect the rectifier circuits in electrical series relation whereby D. C. power is available between said terminal connection and said further terminal connection.

3. A high voltage power source comprising, in combination, a base, a plurality of voltage multiplier rectifier units, insulator supports extending from the base to locate the rectifier units in spaced apart relation, a plurality of conductive shells respectively shielding the rectifier units, a plurality of A. C. generators having rotors and stators, an insulator drive shaft adapted to drive the rotors, input connections respectively between the stators and the rectifier units, output connections between the rectifier units to connect the respective units in electrical series relation, a fluid impermeable housing enclosing the rectifier units, generators, and connections therefor and adapted to contain insulating fluid, and terminal connections in parallel with the series connected rectifier units whereat D. C. power is available.

4. A sustained high voltage power supply comprising, in combination, a fluid impermeable housing adapted to contain insulating fluid, insulator supports secured within the housing, a plurality of conductive shells carried by the insulator supports and spaced apart therealong, an insulator drive shaft penetrating each of the shells, a plurality of A. C. generators respectively secured in the shells, each of said generators having a rotor fixed on the drive shaft to be driven mutually simultaneously, a plurality of voltage multiplier rectifier units respectively supported within the shells and each having a pair of output connections, A. C. input connections respectively between the generators and rectifier units, a plurality of adjustable voltage control units respectively interposed in the A. C. input connections and supported within the shells, an insulator control rod connecting the voltage control units and extending externally of the housing to permit adjustment of the voltage control units, one output connection of each of the rectifier circuits connecting to the supporting shell therefor, a terminal connection to one of the shells and a further terminal connection to one of the rectifier units, and interconnections between the other rectifier units and adjacent shells to connect the rectifier units in electrical series relation whereby D. C. power is available between said terminal connection and said further terminal connection.

5. A high voltage power source comprising, in combination, a plurality of individually shielded voltage multiplier rectifier units, elongated insulator supports to locate the rectifier units in spaced apart relation, a plurality of A. C. generators having rotors and stators, an insulator drive shaft common to the rotors, means for driving the insulator drive shaft and rotors to develop A. C. voltages in the stators, the phases of the A. C. voltages developed by the rotors being electrically staggered relative to each other, input connections respectively between the stators and the rectifier units, voltage level control means included in the input connections for each rectifier unit, output connections between the rectifier units to connect the respective rectifier units in electrical series relation, a fluid impermeable housing enclosing the rectifier units, supports, generators, and connections therefor and adapted to contain insulating fluid, and terminal connections in parallel with the series connected rectifier units whereat D. C. power is available.

6. A sustained high voltage particle accelerator comprising, in combination, a fluid impermeable housing adapted to contain insulating fluid, insulator supports secured within the housing, a plurality of conductive shells carried by the insulator supports and spaced apart therealong, an insulator drive shaft penetrating each of the shells, a plurality of A. C. generators respectively secured in the shells to be driven by the drive shaft, a plurality of voltage multiplier rectifier circuits respectively supported within the shells and each having a pair of output connections, A. C. input connections respectively between the generators and rectifier circuits, one output connection of each of the rectifier circuits connecting to the supporting shell therefor, a terminal connection to one of the shells and a further terminal connection to one of the rectifier circuits, interconnections between the other rectifier circuits and adjacent shells to connect the rectifier circuits in electrical series relation, a particle source connected to a terminal connection, fluidtight means in communication with the particle source extending externally of the housing to evacuate the source and provide a path for particles to be accelerated, and a capacitive voltage divider at least partially enclosing the fluidtight means penetrating each of said shells and in electrical connection thereto at spaced positions along the length thereof whereby a substantially uniform voltage gradient is presented to the particles being accelerated.

7. A high voltage linear particle accelerator comprising in combination, a plurality of D. C. power sources, a plurality of conductive shells respectively shielding the power sources, an output terminal for each of the sources respectively in electrical connection with the shells, insulator supports carrying the shells in spaced apart relation, electrical connections connecting the power sources in electrical series relation, a fluid impermeable housing enclosing the power sources in an insulating medium, high voltage terminals in parallel with the series related sources, a source of particles to be accelerated supported within the housing in electrical connection with one of the high voltage terminals, fluidtight means in communication with the source of particles and extending externally of the housing to evacuate said source of particles, and a capacitive voltage divider enclosing said fluidtight means penetrating each of said shells and in electrical connection therewith at spaced positions along the length thereof whereby a substantially uniform voltage gradient is presented across said high voltage terminals.

8. A linear high voltage particle accelerator comprising in combination, a base, a plurality of voltage multiplier rectifier units, insulator supports extending from the base to locate the rectifier units in spaced apart relation, a plurality of conductive shells respectively shielding the rectifier units, a plurality of A. C. generators having rotors and stators, an insulator drive shaft adapted to drive the rotors, input connections respectively between the stators and the rectifier units, output connections between the rectifier units to connect the respective units in electrical series relation, a fluid impermeable housing enclosing the rectifier units, generators, and connections therefor and adapted to contain insulating fluid, terminal connections in parallel with the series connected rectifier units whereat D. C. power is available, a particle source located within the housing and connected to one of the terminal connections, a capacitive voltage divider comprising a hollow column of alternate insulative and conductive sections penetrating the shells and in electrical connection respectively with the rectifier units at spaced conductive sections along the length thereof, and fluidtight means extending through the hollow column to evacuate the particle source and along which a substantially uniform voltage gradient is presented to particles being accelerated.

9. A high voltage particle accelerator comprising, in combination, a plurality of individually shielded voltage multiplier rectifier units, elongated insulator supports to locate the rectifier units in spaced apart relation, a plurality of A. C. generators having rotors and stators, an insulator drive shaft common to the rotors, means for driving the insulator drive shaft and rotors to develop A. C. voltages in the stators, the phases of the A. C. voltages developed by the rotors being electrically staggered relative to each other, input connections respectively between the stators and the rectifier units, voltage level control means included in the input connection for each rectifier unit, output connections between the rectifier units to connect the respective rectifier units in electrical series relation, a fluid impermeable housing enclosing the rectifier units, supports, generators, and connections therefor and adapted to contain insulating fluid, terminal connections in parallel with the series connected rectifier units whereat D. C. power is available, a particle source located within the housing and connected to one of the terminal connections, means for evacuating the particle source and comprising a path for particles to be accelerated, and a capacitive voltage divider connected across said terminal connections and to said rectifier units at spaced positions along the length thereof whereby a substantially uniform voltage gradient is presented along the particle path.

10. A high voltage linear particle accelerator comprising, in combination, a plurality of D. C. power sources, a plurality of conductive shells respectively shielding the power sources, an output terminal for each of the sources respectively in electrical connection with the shells, insulator supports carrying the shells in spaced apart relation, electrical connections connecting the power sources in electrical series relation, a fluid impermeable housing enclosing the power sources in an insulating medium, high voltage terminals in parallel with the series related sources, a source of particles to be accelerated supported within the housing in electrical connection with one of the high voltage terminals, fluidtight means in communication with the source of particles and extending externally of the housing to evacuate said source of particles, and a capacitive voltage divider enclosing said fluidtight means and penetrating each of said shells comprising a hollow column of alternate insulative and conductive sections, said shells and conductive sections respectively penetrating the shells being in electrical connection whereby a substantially uniform voltage gradient is developed along the fluidtight means to provide a particle path.

11. A high voltage linear particle accelerator comprising in combination, a plurality of D. C. power sources, a plurality of conductive shells respectively shielding the power sources, an insulator drive shaft penetrating each of the shells, a plurality of A. C. generators respectively secured in the shells to be driven by the drive shaft, A. C. input connections respectively between the generators and the power sources, an output terminal for each of the sources respectively in electrical connection with the shells, insulator supports carrying the shells in spaced apart relation, electrical connections connecting the power sources in electrical series relation, a fluid impermeable housing enclosing the power sources in an insulating medium, high voltage terminals in parallel with the series related sources, a source of particles to be accelerated supported within the housing in electrical connection with one of the high voltage terminals, fluidtight means in communication with the source of particles to comprise a path therefor and extending externally of the housing to evacuate said source of particles, and a capacitive voltage divider enclosing said fluid tight means penetrating each of said shells and in electrical connection thereto at spaced positions along the length thereof whereby a substantially uniform voltage gradient is presented to particles accelerated along said path.

12. A high voltage particle accelerator comprising in combination a plurality of individually shielded voltage multiplier rectifier units, means for supporting the rectifier units in spaced apart relation, a plurality of A. C. generators respectively having rotors and stators, an insulated drive shaft adapted to drive the rotors, input connections respectively between the stators and the rectifier units, output connections between the rectifier units to connect the respective rectifier units in electrical series relation, a fluid impermeable housing enclosing the rectifier units, generators, and connections therefor and adapted to contain insulating fluid, terminal connections in parallel with the series connected rectifier units whereat D. C. power is available, a particle source located within the housing and connected to one of the terminal connections, means for evacuating the particle source and forming a path for the particles to be accelerated, and a capacitive voltage divider connected across said terminal connections and to said rectifier units at electrically spaced positions along the length thereof whereby a substantially uniform voltage gradient is developed along the particle path.

References Cited in the file of this patent

UNITED STATES PATENTS

| Number | Name | Date |
|---|---|---|
| 2,219,033 | Kuhn et al. | Oct. 22, 1940 |
| 2,495,908 | Rich | Jan. 31, 1950 |